March 17, 1936.  C. E. BERSTLER  2,034,555
PISTON COMPRESSION RING
Filed Aug. 7, 1934
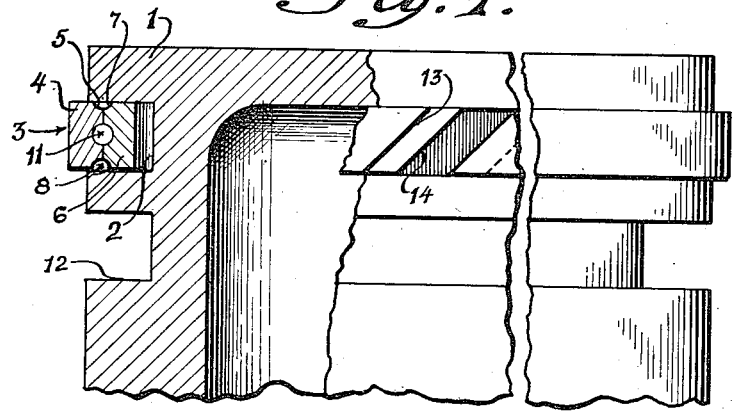
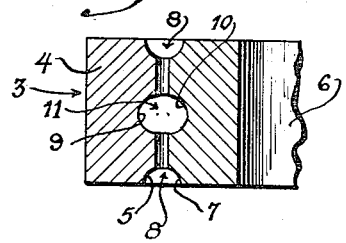
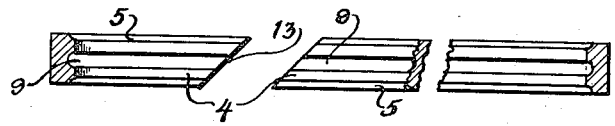
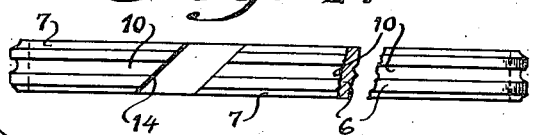
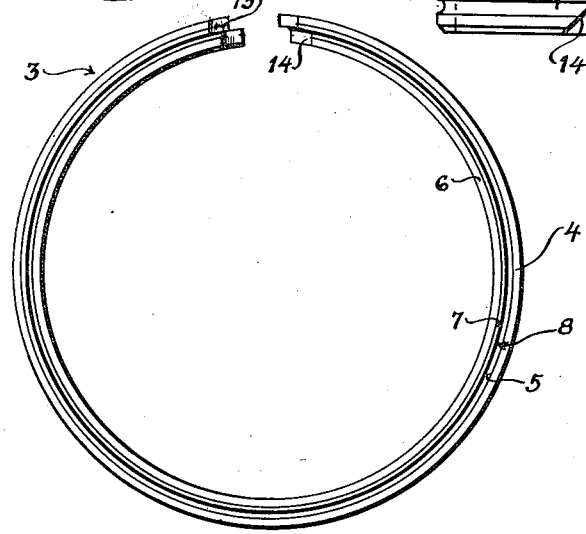
INVENTOR.
Carl E. Berstler
BY Wm. R. Smith
ATTORNEYS.

Patented Mar. 17, 1936

2,034,555

UNITED STATES PATENT OFFICE 2,034,555

PISTON COMPRESSION RING

Carl E. Berstler, Reading, Pa., assignor of thirty-three per cent to William R. Wetherhold, five per cent to Raymond T. Scull, five per cent to John T. Bair, five per cent to George S. Weinerth, all of Reading, Pa., and five per cent to Albert L. Golden, Wyomissing, Pa.

Application August 7, 1934, Serial No. 738,801

1 Claim. (Cl. 309—29)

The present invention relates to a compression ring assembly for pistons, especially adaptable for use in internal combustion engines, and has for its primary object the provision of an improved construction for piston compression rings, capable of preventing the seepage and flow of gases around the ring assembly, thus effecting a considerable saving in fuel while assuring an increased effectiveness in the operation of the engine.

The invention also contemplates the provision of split type piston rings having a duplex construction; that is, a compression ring assembly consisting of a pair of concentric circular piston rings, the rings being associated together to form a unitary structure and having means cooperating to provide oil receiving and retaining chambers or wells for the purpose of preventing the admission of combustion gases in the spaces between the rings, the ring assembly, and the adjacent portions of the piston, thereby eliminating the detrimental effects of compression and gasoline reachinch the crank case as with rings now commonly in use.

Another important feature of the invention resides in the provision of a piston ring assembly which, because of its construction, is capable of better fitting engagement with the cylinder, thereby advantageously preventing piston slap and eliminating wear of the piston ring.

The invention also aims to provide a piston compression ring so constructed that it will more readily conform itself to fit cylinders which may be badly worn out of round or tapered, without, however, depending on strong tension to keep tight in the cylinder and, accordingly, minimizing wearing of the cylinder and piston ring assembly while affording an efficient seal therebetween.

Other important objects and advantages of the invention will be in part obvious and in part pointed out hereafter.

In order that the invention and its mode of operation may be readily ascertained by those persons skilled in the art, I have in the accompanying drawing and in the detailed description based thereupon set out a possible embodiment of the same.

In the drawing:

Figure 1 is a partial elevational view of a piston embodying the features of the invention and having a portion broken away.

Figure 2 is an enlarged cross sectional view of a portion of the piston ring assembly.

Figure 3 is a transversal sectional view through the outer ring of the piston ring assembly.

Figure 4 is a face elevational view of the inner ring of the piston ring assembly.

Figure 5 is a plan view of the compression ring assembly.

Having more particular reference to the drawing wherein like characters of reference will designate corresponding parts throughout, my improved device may be stated to comprise a hollow piston head 1 having a continuous groove 2 cut into its outer peripheral surface and preferably positioned adjacent to the top thereof.

Received within the groove 2 of the piston head 1 is a split type compression ring assembly, designated in its entirety for convenience herein by the reference character 3. The compression ring assembly 3 consists of a pair of circular solid rings disposed in concentric inner and outer relation and each being of substantially the same height and width. The outer ring 4 has the marginal edges of its inner surface cut away to form grooves 5 and is provided with a continuous annular recess 9 upon its inner peripheral face, whereas the inner ring 6 has the marginal edges of its outer surface likewise cut away to form grooves 7, the latter being positioned to register with the grooves 5 of said outer ring for constituting well-like depressions 8 adapted to be covered by the opposed faces of the groove 2 receiving said piston ring assembly 3.

The inner ring, further, is provided with a continuous annular recess 10 upon its outer peripheral face, said recess cooperating with the opposed annular recess 9 of the outer ring 4 to afford an oil chamber 11. As illustrated, recesses 9 and 10 are preferably of semi-circular configuration so that upon registration thereof, the chamber 11 will assume a tubular shape which enhances the sealing properties thereof. It is to be understood that the cylinder 1 may be provided with additional ring receiving grooves as indicated at 12 in Figure 1 of the drawing, in which grooves are mounted my improved piston ring assembly in the manner hereinbefore described.

Whereas I have shown the respective gaps 13 and 14 of the outer and inner rings 4 and 6 as substantially registering with one another, it will be appreciated that, due to the fact that my piston ring assembly consists of an inner and outer piston ring, each of which is lighter and less rigid in its construction than other types of rings, they may be assembled with the gap of the inner ring spaced at substantially 180 degrees from the gap in the outer ring.

In use and operation, because of the particular construction of my improved piston compression ring, it will be understood that with reciprocation of the piston 1 within the cylinder, a part of the oil or lubricant accumulated on the cylinder wall will enter the space between the piston rings 4 and 6 forming the piston compression ring assembly 3 and fill the wells 8 and chamber 10. An oil seal is thus permanently created between the inner and outer piston rings, and within wells 8, which will prevent compression and gasoline from escaping from the engine combustion chamber and from reaching the crank case.

Because of the special construction of the invention, in counter distinction with the other types of rings, I am enabled to fit the ring assembly within the ring receiving groove 2 of the piston, so that the clearance between the inside diameter of the ring assembly and the diameter of the bottom of the piston ring retaining groove 2 is not over .005 of an inch. The existence of this relatively small clearance prevents piston slap in the cylinder and eliminates wear at the top and bottom edges of the compression ring assembly.

Due to the particular construction of the piston rings and by reason of the fact that a film of oil completely surrounds all surfaces of the compression ring assembly, this assembly can expand and contract to conform itself to fit cylinders which may have been badly worn out of round or tapered and also greatly reduce the pressure against the cylinder walls, thereby minimizing wearing of the cylinder walls and piston ring assembly.

Moreover, by reason of the duplex construction of the ring, a material saving in the cost of the ring is effected for, in practice, it becomes necessary to replace only the outer ring 4 of the compression ring assembly because this latter alone is subjected to wear. The inner ring 6, being protected on all sides, may be utilized indefinitely.

Having described my invention, what I claim is:—

A duplex compression ring assembly comprising an outer circular ring having grooves formed at the marginal edges of its inner surface and extending contiguously with the circumference thereof; an inner circular ring disposed concentrically with respect to said outer ring, having grooves formed at the marginal edges of its outer surface and extending contiguously with the circumference thereof, said grooves of the inner ring being arranged to respectively register with the grooves of the outer ring to cooperate therewith for forming continuous oil receiving and retaining wells providing a seal all around the circumference of the ring assembly; and both rings having a recess cut in their respective adjacent faces to extend throughout the circumference thereof, said recesses being disposed intermediately of the marginal grooves and registering to constitute an oil sealed chamber between the rings.

CARL E. BERSTLER.